(12) United States Patent
Eriksson (10) Patent No.: US 7,038,633 B2
(45) Date of Patent: May 2, 2006

(54) ANTENNA SYSTEM AND NET DRIFT VERIFICATION

(75) Inventor: Mats Gunnar Hakan Eriksson, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 30 days.

(21) Appl. No.: 10/488,666

(22) PCT Filed: Aug. 26, 2002

(86) PCT No.: PCT/SE02/01522

§ 371 (c)(1),
(2), (4) Date: Sep. 17, 2004

(87) PCT Pub. No.: WO03/021287

PCT Pub. Date: Mar. 13, 2003

(65) Prior Publication Data

US 2005/0012658 A1    Jan. 20, 2005

(30) Foreign Application Priority Data

Sep. 4, 2001    (SE)    .................................... 0102930

(51) Int. Cl.
*H01Q 21/24* (2006.01)

(52) U.S. Cl. ...................... 343/853; 343/876; 343/754; 342/375

(58) Field of Classification Search ................ 343/754, 343/853, 876; 342/372, 373, 374, 375; 455/562.1
See application file for complete search history.

(56) References Cited

U.S. PATENT DOCUMENTS

| | | | | |
|---|---|---|---|---|
| 5,248,982 A | * | 9/1993 | Reinhardt et al. | 342/375 |
| 6,078,289 A | * | 6/2000 | Manoogian et al. | 342/373 |
| 6,104,935 A | * | 8/2000 | Smith et al. | 455/562.1 |
| 6,157,343 A | * | 12/2000 | Andersson et al. | 342/371 |
| 6,577,879 B1 | * | 6/2003 | Hagerman et al. | 455/562.1 |
| 6,697,017 B1 | * | 2/2004 | Shmuel | 342/378 |
| 6,870,515 B1 | * | 3/2005 | Kitchener et al. | 343/853 |
| 6,950,631 B1 | * | 9/2005 | Solbach | 455/67.14 |

* cited by examiner

*Primary Examiner*—Tan Ho (57) ABSTRACT

System and method for in-operation calibration of phased array antenna system, involv-ing outputting first and second calibration signals on separate calibration nets through same switches of transmit and receive modules (TRM) and transmit and receive feed network branches for detecting whether system is operational. Allows moreover, identifi-cation of drift in specific calibration net and compensation therefore.

15 Claims, 10 Drawing Sheets

| $D_{nhv}$ | 1 | 2 | 3 | 4 |
|---|---|---|---|---|
| 1 | ○ | ○ | ○ | ○ |
| 2 | ○ | ○ | ○ | ○ |
| 3 | ○ | ○ | ○ | ○ |
| 4 | ○ | ○ | ○ | ○ |

Fig. 5

| $D_{nhv}$ | 1 | 2 | 3 | 4 |
|---|---|---|---|---|
| 1 | ● | ● | ○ | ○ |
| 2 | ● | ● | ○ | ○ |
| 3 | ■ | ■ | □ | □ |
| 4 | ■ | ■ | □ | □ |

Fig. 6

| $D_{nhv}$ | 1 | 2 | 3 | 4 |
|---|---|---|---|---|
| 1 | ○ | ■ | ○ | ■ |
| 2 | ● | □ | ● | □ |
| 3 | ■ | ○ | ■ | ○ |
| 4 | □ | ● | □ | ● |

Fig. 7

| | | |
|---|---|---|
| ○ | C1 | legend |
| ● | C2 | |
| □ | C3 | |
| ■ | C4 | |

ANTENNA SYSTEM AND NET DRIFT VERIFICATION

This application is a 371 of PCT/SE02/01522 filed Aug. 26, 2002.

FIELD OF THE INVENTION

The present invention generally relates to an antenna system network architecture and a method for detecting and correcting drift in such a network. More particularly the present invention relates to an active phased array antenna system and a calibration method for such a system.

BACKGROUND OF THE INVENTION

In some antenna systems with steerable beams or directional capabilities, such as active phased array radar antennas or active telecommunication base-station antennas, numerous antenna elements are arranged equidistantly in a plane whereby each element is adapted to emit and receive microwave signals.

In those systems, typically a microwave exciter and receive unit is provided for generating and receiving a signal. The exciter and receive unit is connected to a branch like transmission network, through which signals are emitted and received. The transmission network connects to respective transmit and receive modules, TRM, comprising electrically controllable phase shifters and amplifier stages through which the amplitude and phase delay of signals can be controlled. The transmit and receive modules are connected to the antenna elements. Typically, dipole elements may be used as antenna elements.

When signals are provided simultaneously to the plurality of elements, a plane wavefront parallel to the plane of the array is generated because of the in-phase interference of individual signals. When the phases of signals are incremented for each antenna element with regard to an adjacent element, a wavefront is propagating at a non-parallel angle with regard to the plane of the elements, which angle is dependent on the incremental phase delay. The elements may also be arranged at non-equidistant intervals, but then the individual delays are correspondingly controlled to provide a plane wavefront. By arranging a plurality of elements on a plane and controlling the emission with regard to two directions, the resulting direction of the emitted beam and the sensitivity of the received signal may be controlled in three-dimensional space.

One disadvantage associated with known active antenna systems is the amount of hardware required. A phased array antenna may for instance have several thousand individually controllable antenna elements.

Moreover, it is important that all individual transmission paths are of the same or of known length to accomplish the desired beam-steering control over the desired bandwidth.

An important characteristic of an antenna system with high sensitivity is the directional properties as expressed by the level of the side-lobes compared to the level of the main lobe.

For instance for airborne radar systems, such as Airborne Early Warning (AEW) systems, the side-lobes must be so well attenuated that unwanted ground and sea clutter can be efficiently suppressed. Low sidelobes are also required in order to suppress signals from other emitters in the neighbourhood such as signals from active hostile jamming. The low sidelobe level specification necessitates a tight control of the amplitude and phase of each transmit/receive module, TRM. When transmitting, the amplitudes of all TRMs have identical settings, whereas amplitude tapering is applied in receive mode. In air-cooled systems, the phase and amplitude control must cope with the large temperature variations that may prevail. This particularly applies to air-borne radar systems. For instance the feed and receive network may be subject to thermal expansion/contraction, which alters the phase of individual signals. One example of AEW system has been shown in U.S. Pat. No. 4,779,097.

Generally, antenna systems are complex systems with many components, which require accurate control.

In a distributed transmission system, utilising microwave wave-guides, the transmit and receive modules account for a majority of the errors that are introduced. Careful design of these parts with respect to long-term stability of performance, supply voltages, internal heating and ambient temperature is necessary but often not sufficient. Therefore, a need has arisen as to be able to calibrate antenna systems during operation.

Figure 1:
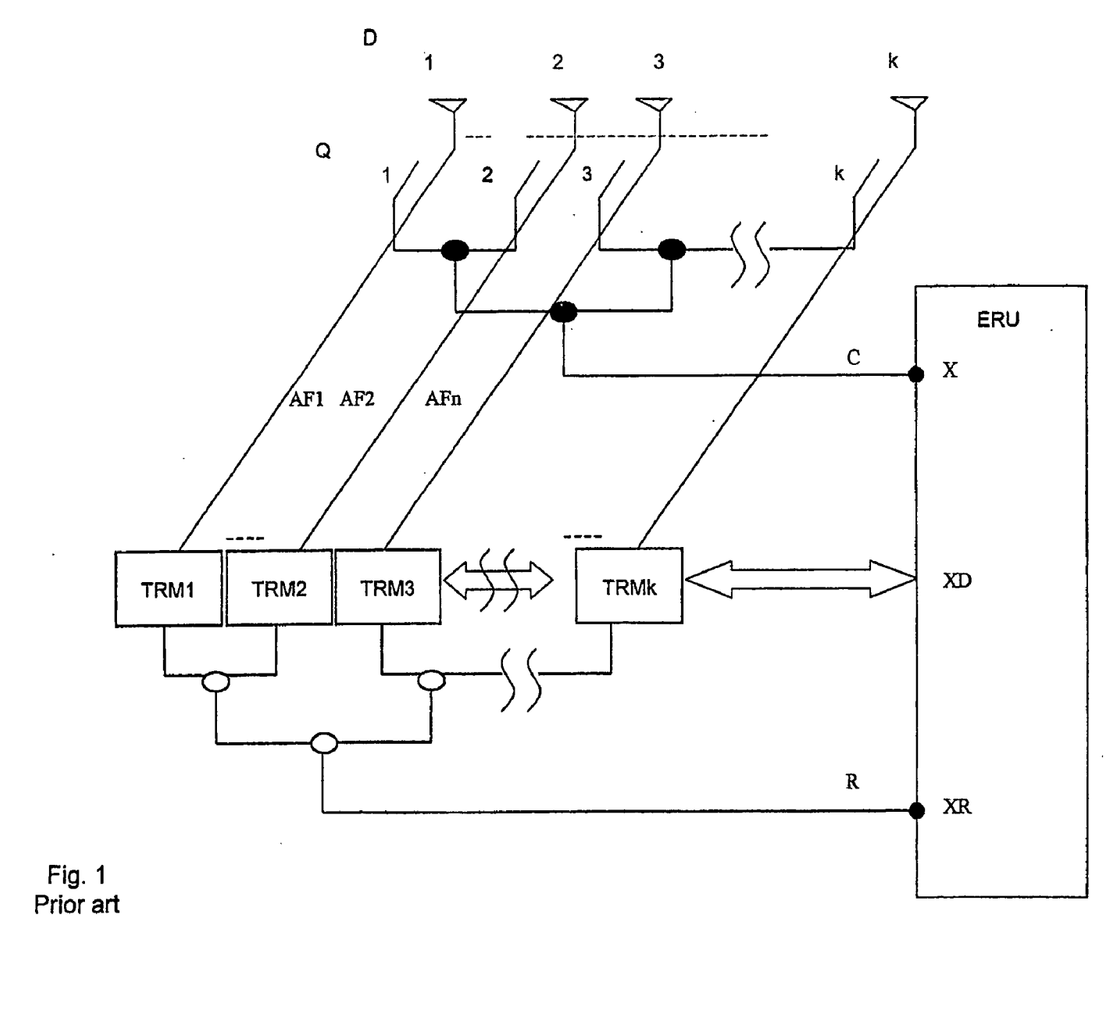
FIG. 1 shows a known phased array antenna system comprising a calibration network.

In FIG. 1, a known antenna system has been shown. The system comprises an exciter/receiver unit ERU, a plurality of dipole antennas D1–Dk, respective couplers Q1–Qk being arranged adjacent the respective dipole antennas, a feed and receive transmission network (R) connecting the exciter/receiver unit and a plurality of T/R modules TRM1–TRMk, another feed network, AF, and a calibration network, C1.

The 1-k antenna elements may be evenly dispersed over a rectangular plane in a pattern of rows and columns.

In FIG. 1, a subset of the antenna elements, for instance D1–Dk, corresponding to a first row (or column) has been shown for simplicity. It should be understood that typically many more elements would form the first row and that subsequent elements up to element Dkk would correspond to additional rows.

The exciter/receiver unit, ERU, has a data bus XD, over which the exciter receiver unit controls the individual transmit and receive modules TRM for obtaining the desired directional capabilities.

Each respective T/R module has a feed AF that leads to an antenna element. The calibration network C constitutes a branch like structure with equally long distance to each respective coupler Q1–Qk. Calibration signals are sent through a port X, of the ERU, returning through a selected transceive and receive module TRM and returning through the first feed network R back to the ERU over the transmission network, R. The phase and amplitude of the signal is compared to a fixed reference for a given path. This procedure is completed for all transceive and receive modules, TRM.

Prior art document U.S. Pat. No. 5,412,414 shows a similar phased array radar system providing in-operation calibration. The radar system comprises an exciter, a receiver, a transmit/receive transmission network, T/R modules and dipole elements. Respective directional calibration couplers are provided adjacent the dipole elements for transferring signals through these to/from a calibration network which is different from the transmit/receive network. By issuing transmitting calibration signals from the exciter and leading signals through the transmit/receive transmission network and through individual T/R modules to couplers adjacent selected dipole elements, and return through the calibration network, variations in the transmit/receive network and associated components can be analysed. Likewise, by issuing receiving calibration signals from the exciter and leading signals through he calibration network to couplers adjacent selected dipole elements, and return through T/R module and the transmit/receive network, variations in the transmit/receive network and associated components can be analysed. One drawback with the above system is that an initial calibration, using external measurement equipment, seems to be required before in-operation calibrations can be carried out.

U.S. Pat. No. 5,874,915 shows an AEW phased array system having a plurality of selector switches for coupling a respective low noise receive amplifier or transmit amplifier to one of three antenna elements in a respective column of the antenna array.

SUMMARY OF THE INVENTION

It is a first object of the present invention to set forth an antenna system, which allows verification of error free operation while the system operates or in direct connection with operation.

It is a second object of the invention to set forth an antenna system in which calibration nets or branches through a calibration net can be compared.

It is a third object of the invention to achieve a calibration network structure that can be cost effectively produced.

It is a fourth object of the invention to enable the drifts in panels caused by e. g. hot or cool spots to be detected.

It is a fifth object to accomplish extensive calibration possibilities in an antenna system of less extensive complexity with a reduced number of components.

It is a further object to detect drift in a calibration net for an antenna system.

It is another object to establish which calibration net is drifting.

It is a still further object to calibrate a calibration network.

Further advantages will appear from the following detailed description of the invention.

DETAILED DESCRIPTION OF PREFERRED EMBODIMENTS OF THE INVENTION

Figure 2:
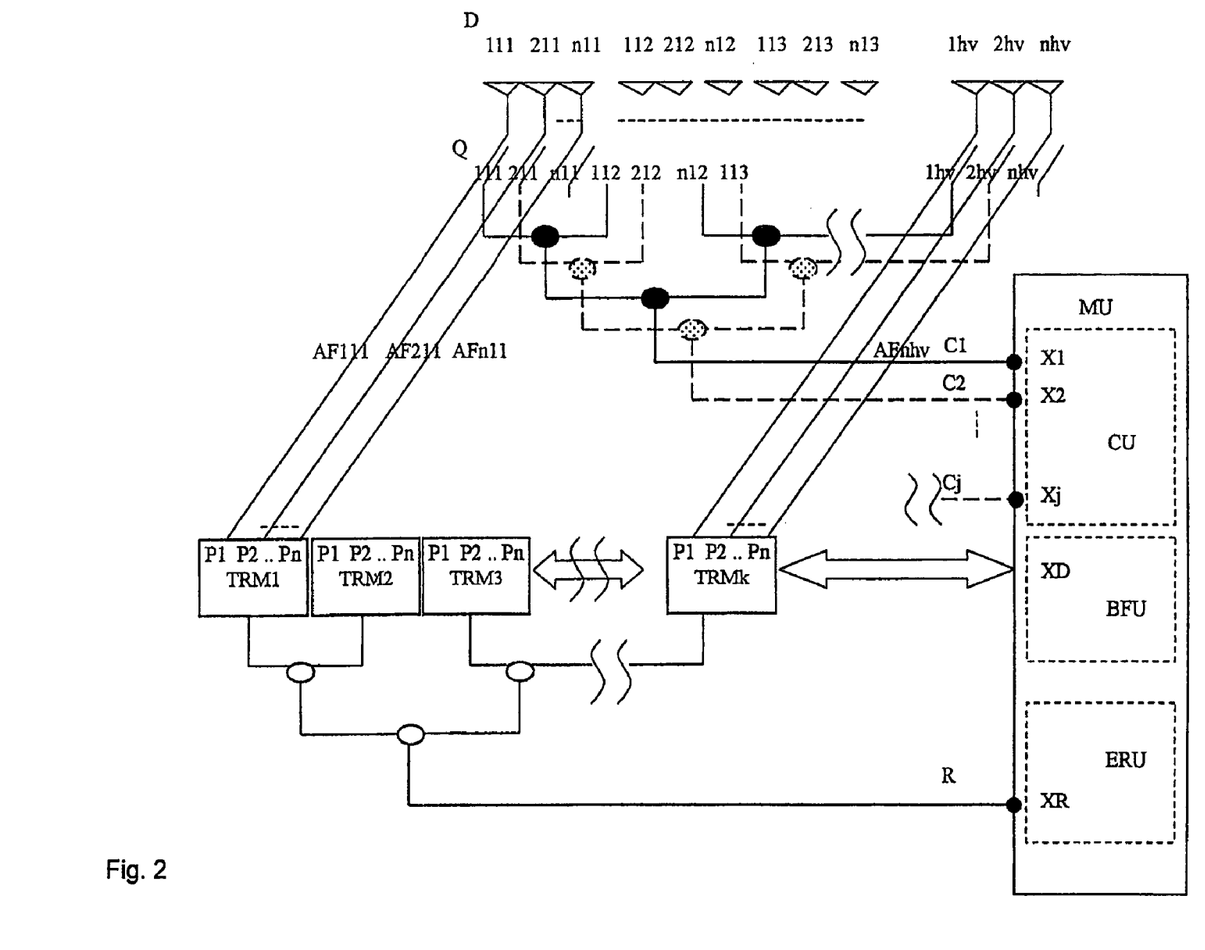
FIG. 2 shows a phased array antenna system according to a first embodiment of the invention.

In FIG. 2, a first preferred embodiment of an antenna system according to the invention has been shown. The system comprises a main unit MU comprising, an exciter/receiver unit, ERU, a beamforming unit BFU, a calibration unit CU, a plurality of antenna elements (D), a feed and receive transmission network, R, connecting the exciter/receiver unit and a plurality of T/R modules, TRM1–TRMk, antenna feed branches AF1–AFn, connecting T/R modules and antenna elements. Each respective T/R module has a plurality of ports P1–Pn, whereby each port leads to an antenna element D11–Dnhv.

A plurality of couplers Q111–Qnhv is provided, such that for each antenna element D there is preferably arranged a coupler Q adjacent an antenna element. As appears from the figure, for instance coupler Q211 is arranged next to the antenna element D211. Preferably, the respective coupler is arranged close to the antenna element and adjacent a segment of the antenna feed AF2 for that particular element. A plurality of calibration networks are provided, C1–Cj, and each calibration network couples to a subset of the couplers Q111–Qnhv. Each calibration net branches off from a port, X1–Xj, on the calibration unit, CU, to various couplers belonging to a subset of antennas to be served. Hence, each calibration network is separate and connected to a designated port on the calibration unit, CU. The separate calibration networks are not connected to one another. By way of example, if a signal is issued on port X1 of CU, the signal is lead to calibration network C1 and to couplers Q111, Q112, Qn12, Q1hv and coupled to respective antenna feeds to corresponding ports on the various T/R modules. Likewise, a signal on port P1 of TRM1 will be transferred to coupler Q111, calibration network C1 and port X1 of calibration unit CU.

Advantageously, the couplers are formed as strips arranged at a point adjacent a given antenna feed and close to the antenna element in question. However; the couplers may also be electrically connected over a suitable impedance or waveguide to the antenna element. The coupler may be realised in stripline technology as is well known in the art.

The calibration nets and the feed and receive net are advantageously formed as tree structures with a number of branches. However, other grid structures and non-branched structures are also possible.

Figure 3:
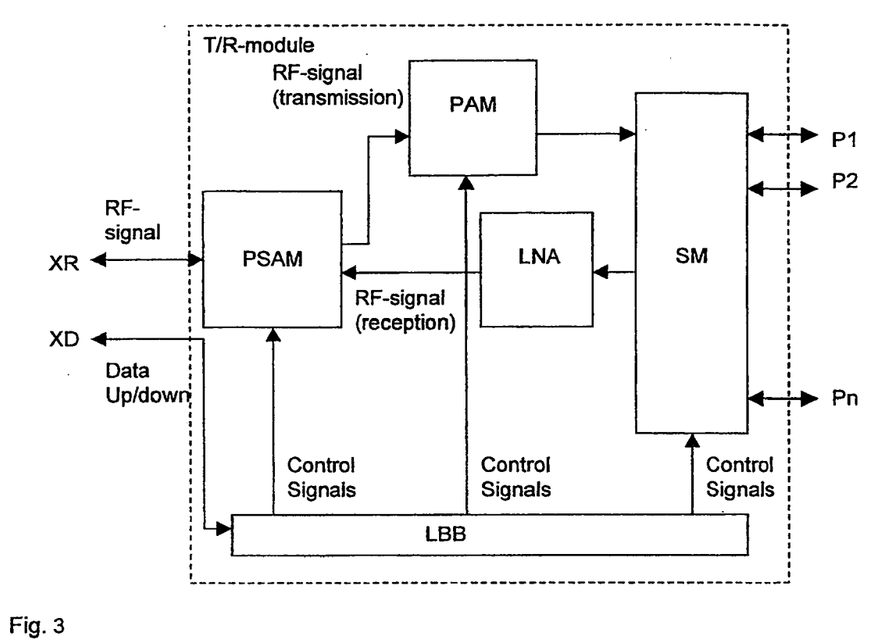
FIG. 3 shows a transmit and receive module according to a first embodiment of the invention.

In FIG. 3, a T/R module according to the invention has been shown. The T/R module TRM is capable of transmitting and receiving signals to and from the respective antennas, the calibration network (C1–Cj) and the transmission network, R, according to suitable control from the main unit MU over the databus XD.

The T/R module comprises a phase shift and attenuation module, PSAM, a power amplifier module, PAM, a logic bias board, LBB, a low noise amplifier, LNA, and a switch module, SM. The logic bias board, LBB, controls the individual functions of the above mentioned modules, such that the phase and amplitude of both transmitted and received signals are controlled according to a desired directivity pattern in a conventional fashion. The logic bias board, LBB, moreover controls the switch module, SM, to select radio frequency signals to or from the XR port of the ERU to one of the various ports P1 to Pn in a manner, which shall be explained later.

In transmit mode, the antenna system controls the beam forming in a conventional way. A microwave signal is emitted on the transmission network R. This signal is received at the various T/R modules TRM substantially synchronously. In each T/R module (1-k) for each connection (1-n), the input signal is processed individually, such that respective signals to respective antenna elements (1-h·v) have the required phase and amplitude properties for obtaining the desired beam form. For this purpose, corresponding signals are sent over port XD to logic bias board, LBB, which controls the phase shift and attenuation module, PSAM, and the power amplifier module, PAM.

In receive mode, the antenna system accomplishes the required focussing in a conventional way by controlling the phase and amplitude of incoming signals from low noise amplifier LNA in each respective T/R module. For this purpose, control signals are issued from the logic bias board LBB to control the phase and attenuation module, PSAM.

Figure 4:
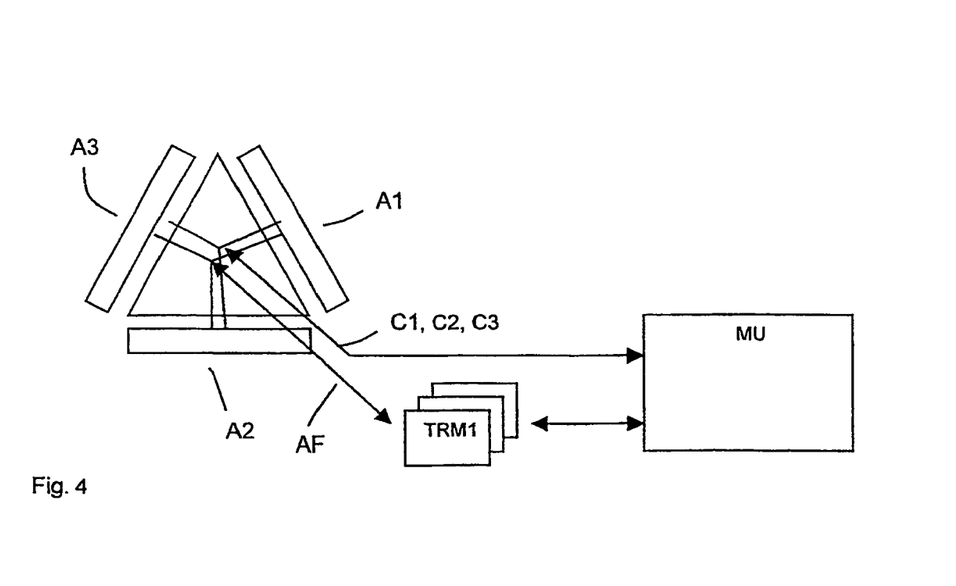
FIG. 4 shows the antenna system according to a first embodiment of the invention, comprising phased array antenna panels as seen from above.

In FIG. 4, a preferred embodiment of an antenna system according to the invention has been shown comprising three phased array antenna panels A1, A2 and A3 with faces pointing out radially with an angle of 120° between each normal for the respective panels into respective sectors. The panels have the same number of antenna elements and are preferably but not necessarily identical. As appears from the figure the panels are connected via the AF and C networks to T/R modules located a distance away—however small it may be—from the panels and further on to main unit, MU. The antenna elements of one given panel can also be arranged in groups, which for instance are predisposed in given directions.

The antenna elements of a given panel number are connected to a given port number of every transmit and receive unit. According to the invention, each panel and corresponding sector is served one at a time, by operating the switches SM in each TRM module synchronously and selecting a given port number.

Hence, each T/R module serves all three panels through ports P1–P3 (n=3) in a sequential or time multiplexed manner, whereby during operation each switch module SM of a particular T/R module serves a particular port number. Thereby, the antenna is beaming into each sector according to the desired beam pattern.

In base station applications, the sectors may be illuminated sequentially with a fixed period and in a fixed order. For other applications such as radar, the panels may be served so as to give preference to a desired direction or with a certain weight with regard to a certain sector, that is, serving a particular sector longer than average according to the choice of an operator.

It appears, comparing the above antenna with a full permanent coverage, that the number of T/R modules, the feed and receive network complexity, and the exciter receiver unit processing power requirement are cut by two thirds.

In the above example, three panels are utilised. However, the inventive concept may just as well be applied to two or four panels or a larger number of panels. If only two panels are used, the antenna panels can be mounted back to back, which provides for reduced dimensions of the calibration and antenna feed networks.

Figure 5:
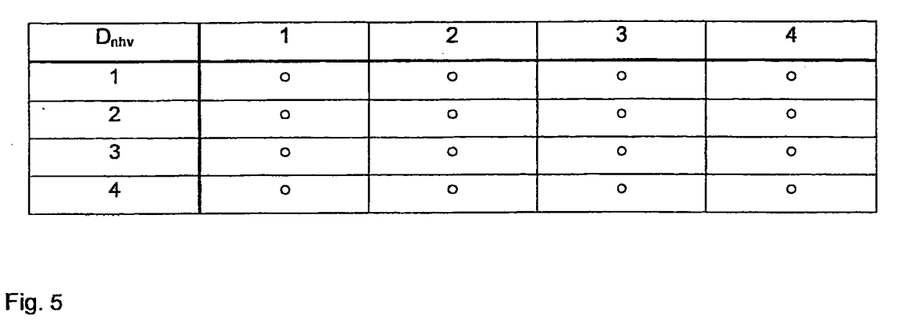
FIG. 5 is a schematic illustration of arranging calibration nets of a phased array antenna panel.
Figure 6:
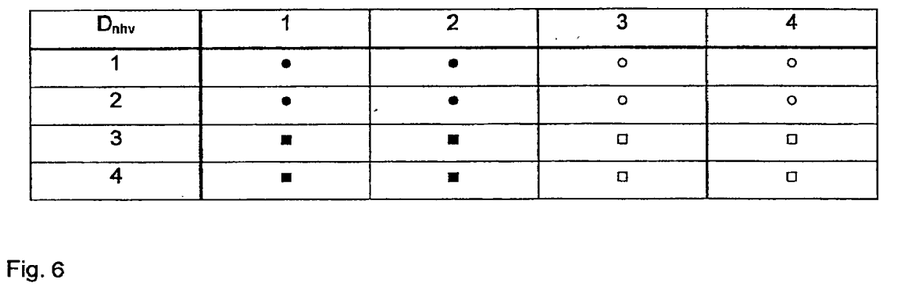
FIG. 6 is a schematic illustration of a second embodiment of arranging a calibration net of a phased array antenna panel according to the invention.
Figure 7:
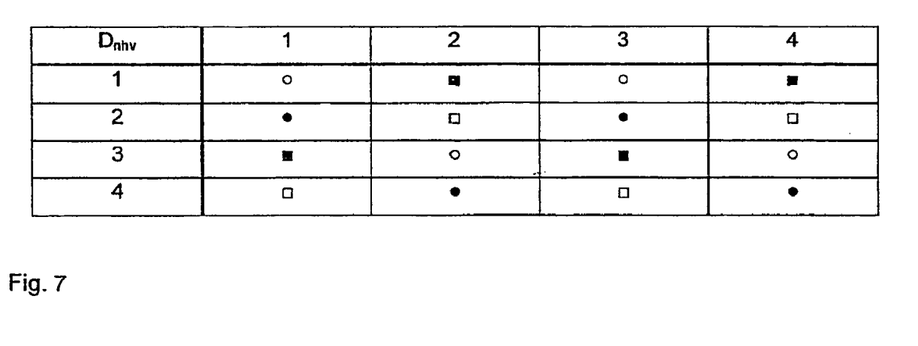
FIG. 7 is a schematic illustration of a third embodiment of arranging a calibration net of a phased array antenna panel according to the invention.

Advantageous embodiments combining aspects of the first and second embodiments shall now be described. FIG. 5–7 are schematic illustrations of how couplers belonging to specific calibration nets, C1–Cj, are distributed over an antenna panel. These panels may be plane rectangular panels having antenna elements Dnhv, where n could denote the panel number (i.e. A1–A3), h could denote the horizontal position of the antenna element on a given panel number and v could denote the vertical position of the antenna element on a given panel number.

In FIG. 5, a first embodiment is disclosed for arranging the calibration network, having the basic outline as shown in FIGS. 2–4. Three calibration networks are provided, hence j=3 in FIG. 2 and three panels are provided, n=3. The calibration networks are formed as separate nets (C1, C2 . . . Cj) not being connected to one another, each net being connected to a respective port (X1, X2 . . . Xj) on the calibration unit (CU). Each calibration network is dedicated to one panel exclusively; that is, all couplers of a particular calibration network are mounted adjacent antenna elements of the same antenna panel. As stated above, the calibration nets (C1–Cj) are independent with a minimum of mutual coupling. Advantageously, the calibration nets (C1–Cj) are not duplicates in order to prevent the same error characteristics over temperature from occurring.

According to a second embodiment for arranging the calibration nets, having the basic outline as shown in FIGS. 2–4, four different calibration networks, j=4, have been provided. The antenna panels have been shown in FIG. 6, in which the couplers of the respective calibration nets C1, C2, C3 and C4 are mapped to the antenna elements, Dhv, which arranged in a two dimensional plane at respective horizontal and vertical locations. Here, four couplers corresponding to calibration net C2 is arranged adjacent antenna elements D11, D12, D21, and D22 of a particular antenna panel. Couplers connected to a calibration net C1 is arranged adjacent antenna elements D31, D41, D32 and D41. It appears from the figure that calibration net C3 is associated with the four lower left antenna elements and C4 is associated with the four lower right antenna elements. As in the examples above, in total, for instance three panels may be arranged, whereby the four calibration nets above, C1–C4 are arranged in the same manner for all three panels as shown in FIG. 5. Moreover, the layout of the couplers may be identical for the three panels.

As mentioned above, the calibration nets are advantageously formed as separate nets, which are isolated from one another, each calibration net being connected to a respective port X1, X2, X3 . . . on the main unit MU. However, some part of the calibration net could also be common and various calibration nets could branch off from a switch, such that individual branches of the calibration nets could be disconnected from one another. Various calibration nets could also branch off from a node. Generally, it is desired that individual branches can be exposed to calibration signals such that alternative paths through the calibration net or alternative calibration nets can be compared.

A third embodiment for arranging the calibration nets having the basic outline as shown in FIGS. 2–4 is shown in FIG. 7. This embodiment is similar to the FIG. 6 embodiment, but the couplers of the particular calibration nets are distributed over the antenna panel in such a manner that no two couplers of the same calibration net is arranged adjacent one another.

For the above three embodiments, it should be understood that in most practical circumstances the number of antenna elements would be much larger, for instance thousands of antenna elements per panel.

The FIG. 5 embodiment above has the advantage that it requires a simple calibration feed microwave transmission layout.

The FIG. 7 embodiment has the advantage that dimensional changes related to local areas of a given panel can be detected according to the calibration routines according to the invention, as shall be explained in the following. This is particular advantageous for applications where the panels are subject to harsh climate changes leading to local hot and cool spots. These phenomena typically occurs for air cooled air borne radars.

A first calibration routine of the invention shall now be explained with reference to FIGS. 8, 9 and 10. This routine could relate to any of the embodiments described with relation to FIGS. 2–6, described above.

Figure 8:
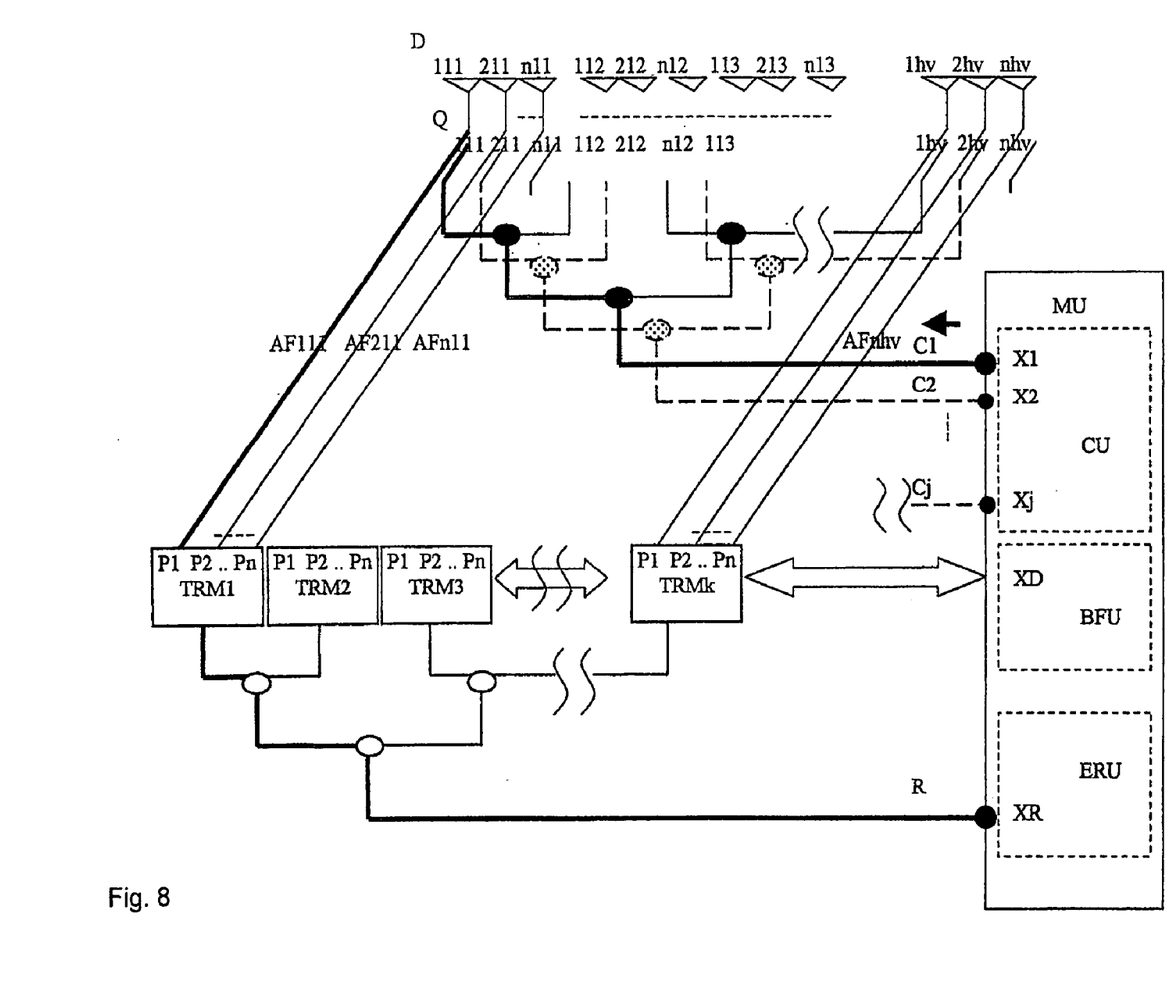
FIG. 8 shows a first step of a preferred calibration routine according to the invention.

According to FIG. 8, a calibration signal is output on port X1 and transferred on calibration net C1. A signal is derived via the coupler Q111 associated with antenna element D111. The signal is transferred through respective antenna feed AF111 by operating the switch to P1 in TRM1. All other ports of all other T/M modules are closed.

The attenuation and phase delay $CS_{111R}$ of the signal is measured. This value is compared with fixed values $CS_{111Rfix}$ derived for instance from a reference measurement using additional calibration apparatus. The result of the comparison, $\Delta 111$, corresponds to the attenuation and phase delay differences at a given time in relation to the reference values in T/R module 1, antenna feed AF111 and the corresponding branch in receive and transmit network R.

The set of values $\Delta 111$ is stored for being able to compensate the amplitude and phase of signals from or to the exciter and receiver module for accomplishing the directional steering capabilities of the antenna system. This corresponds to the conventional calibration of the steerable antenna system.

Figure 9:
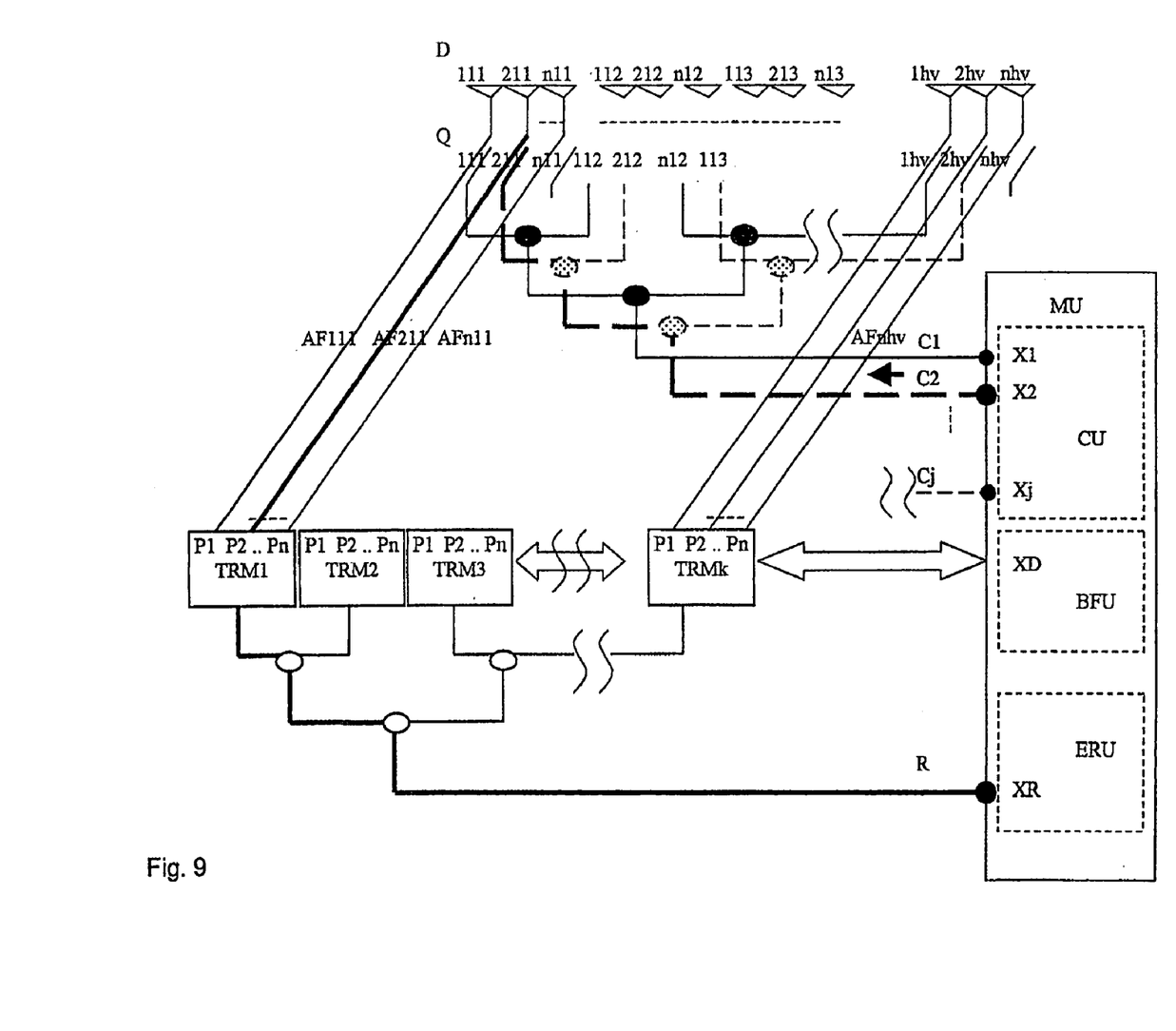
FIG. 9 shows a second step of a preferred calibration routine according to the invention

Subsequently, a new calibration signal is emitted on port X2, as shown in FIG. 9, and transferred on net C2. The signal derived from the coupler associated with element D211 is lead through port P2 of TRM1 and propagated on the transmission network R into port XR and a delay $CS_{211R}$ is measured.

$CS_{211R}$ is compared with a fixed value $CS_{211Rfix}$. The result, $\Delta 211$, as above, corresponds to the attenuation and phase delay in T/R module 1, the antenna feed AF2 and the corresponding branch in receive and transmit network R.

Besides errors in the port switch (1-n) in TRM1 together with the cabling of AF1 and AF2, the results from the two measurements $\Delta 111$ and $\Delta 211$ should be of the same size. If not, a drift in one (or both) of the calibration nets 1 and 2 has been detected (or a drift in AF1 or AF2).

Hence, it can be established whether the system is functioning correctly or not.

Figure 10:
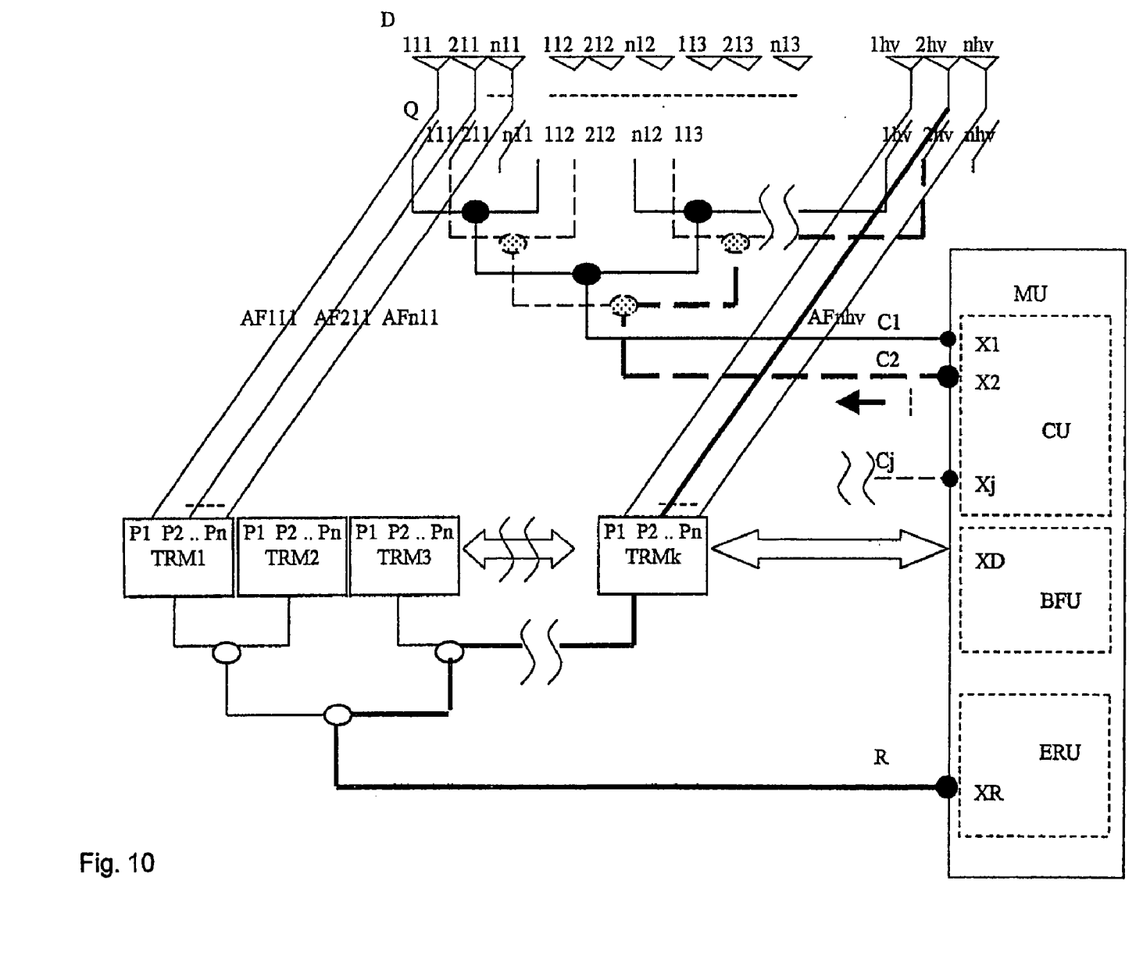
FIG. 10 shows a third step of a preferred calibration routine according to the invention.

Subsequently, a new calibration signal is emitted on port X2 and transferred on net C2, as shown in FIG. 10. The signal derived from the coupler associated with element D2hv is lead through port P2 of TRMk and propagated on the transmission network R into port XR and a delay $CS_{2hvR}$ is measured.

$CS_{2hvR}$ is compared with a fixed value $CS_{2hVRfix}$. The result $\Delta hv$, as above, corresponds to the amplification and phase delay in T/R module TRMk, antenna feed AF2hv and the corresponding branch in receive and transmit network R.

This routine is repeated for all antenna elements and all calibration nets.

Now we have a number of m times n measurements that should agree. As an example, where n=3 and a situation is occurring where two measurements agree, the third measurement and corresponding calibration net is most probably drifting.

Hence, apart from establishing whether the system is functioning correctly or not, in the latter case K can moreover be established in which calibration net there is a drift. Moreover, the drifting calibration net can be calibrated by appropriate adjustment of the given amplitude and phase settings for the individual T/R modules, all controlled over the databus XD of the excite and receive unit, ERU.

Hence, not only are the TIM modules and antenna feed examined with regard to drift, also the calibration nets are subject to an examination for drift. Thereby, the erroneous calibration net can be identified and corresponding compensation can be carried out. This procedure can be done virtually while the system operates or causing only a short interruption.

Figure 11:
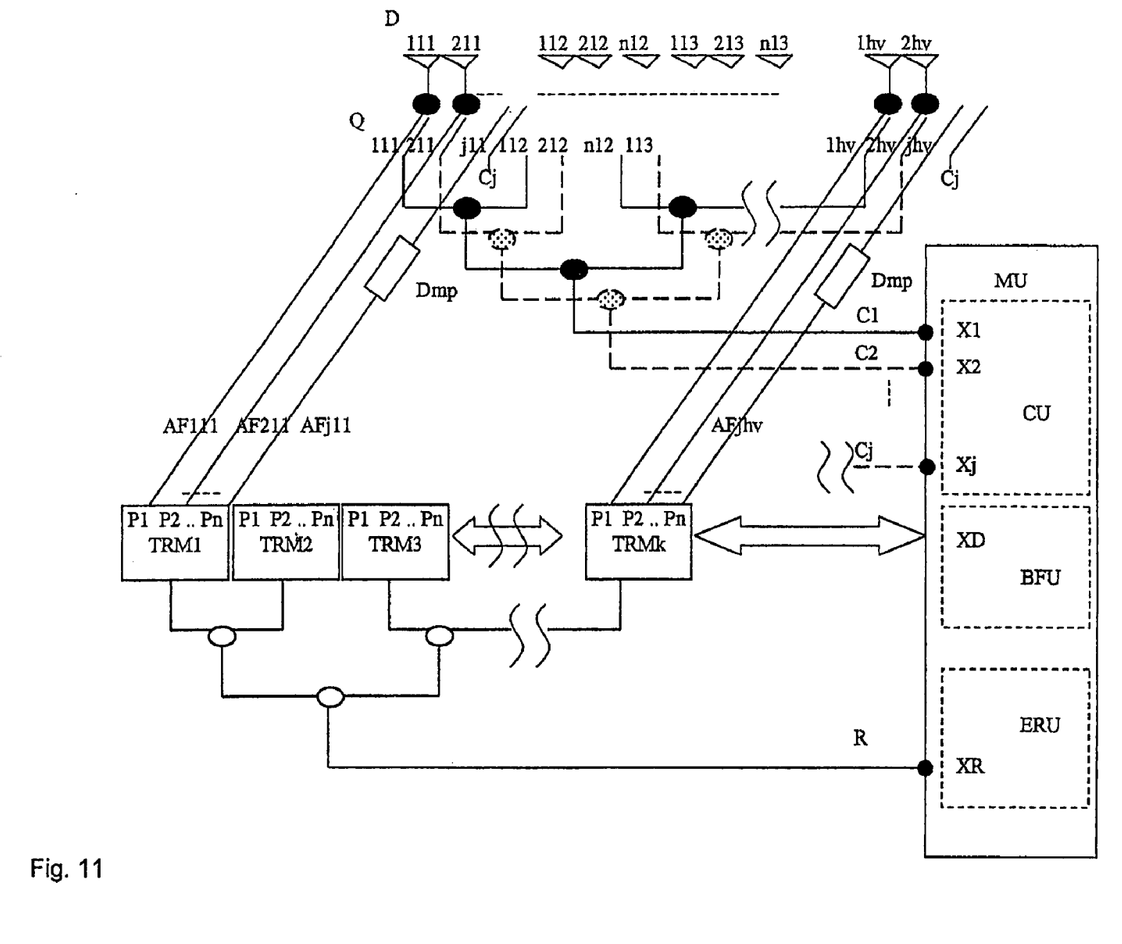
FIG. 11 shows a second embodiment of a phased array antenna system according to the invention.

In FIG. 11, a third embodiment of the radar system according to the invention has been shown. In this embodiment a number of couplers Cj have been provided which are not associated with any antenna element. However, respective antenna feed lines AFj11, . . . AFjhv are provided to the respective couplers Cj for each T/R module. These antenna feeds comprises a dump impedance Dmp in order to match the antenna feed to the antenna feeds connecting to the dipole elements. Hence, according to the invention a calibration of the calibration net is also rendered possible for systems in which n=3 (TRM ports) or systems which does not utilise time multiplexing between different sectors, n=2 (TRM ports).

Figure 12:
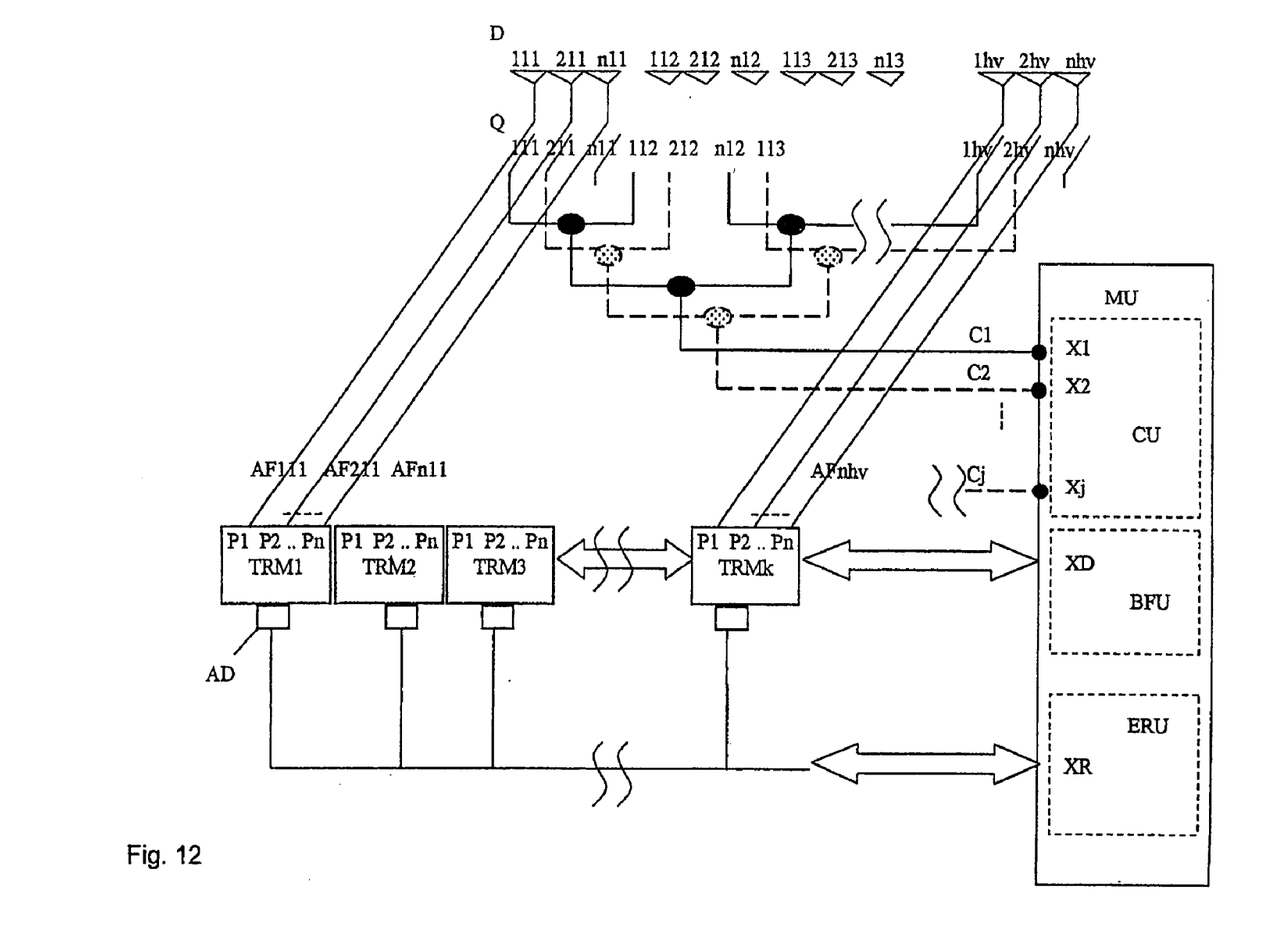
FIG. 12 shows a third embodiment of a phased array antenna system according to the invention.
Figure 13:
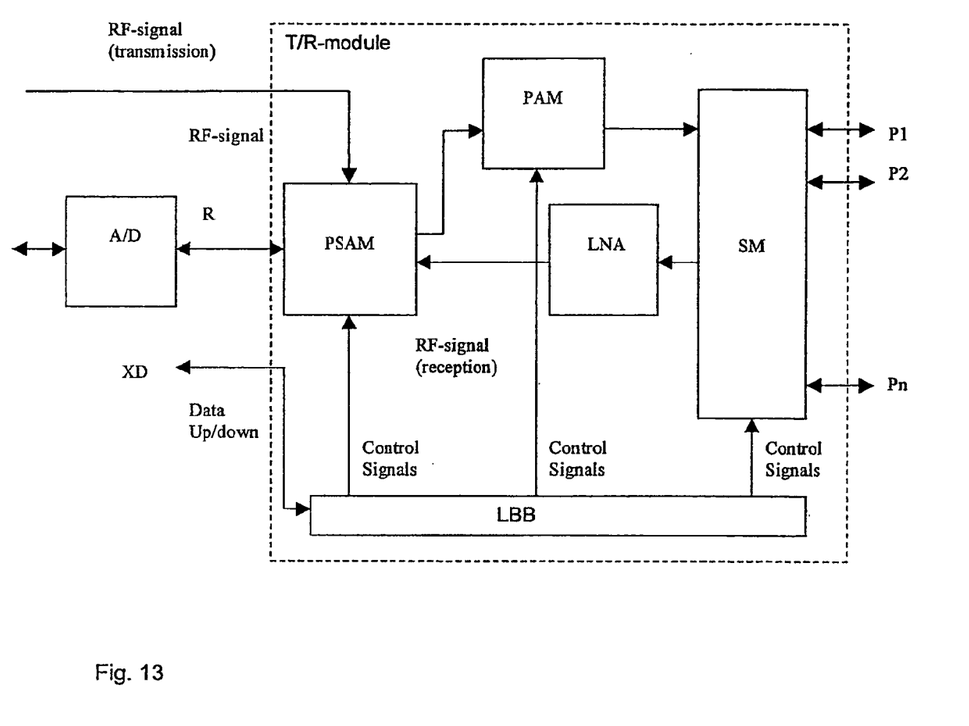
FIG. 13 shows an embodiment of a transceive and receive module according to the third embodiment of the antenna system according to the invention.

In FIG. 12, the receive transmission network (R) is replaced with a digital transmit and receive transmission network, whereby A/D converters are arranged in or integrated with each TRM. Appropriate digital signalling are transferred over a databus XD from the transmit and receive unit ERU. In FIG. 13, the arrangement of the A/D converter in connection to a T/R module has been shown. As will be understood the calibration properties explained above also pertains to this embodiment.

The invention claimed is:

1. An active antenna system (AS), said system comprising:
   a plurality of antenna elements (D);
   an exciter/receiver unit (ERU);
   a plurality of transmit/receive (T/R) modules (TRM1–TRMk);
   a feed and receive transmission network (R) connecting said ERU and said plurality of T/R modules;
   a plurality of antenna feeds (AF) connecting said T/R modules and said plurality of antenna elements;
   a beamforming unit (BFU), wherein said beamforming unit (BFU) controls the phase and amplitude of signals transmitted through each T/R module to produce a desired beamform from said plurality of antenna elements;
   a calibration unit (CU);
   a calibration network coupling said calibration unit (CU) and points on said antenna feeds (AF), wherein said calibration network comprises a plurality of alternative calibration nets (C1, C2 . . . Cj), and wherein each T/R module comprises a switch (SM) for switching between alternative antenna feeds (A/F) and thereby between alternative calibration nets.

2. The active antenna system according to claim 1, wherein calibration signals from alternative calibration nets (C1, C2 ... Cj) are selectively compared to determine whether a drift in at least one of said calibration nets has occurred.

3. The active antenna-system according to claim 2, wherein each of said alternative calibration nets (C1, C2 ... Cj) is coupled to a plurality of said antenna elements (D) by means of a plurality of signal couplers (Q).

4. The active antenna system according to claim 3, wherein each of said plurality of signal couplers (Q) is coupled to one of said plurality of antenna feeds (AF).

5. The active antenna system according to claim 2, wherein at least one of said plurality of calibration nets (C) is coupled to an antenna feed (AF) not associated with an antenna element (D).

6. The active antenna system according to claim 1, wherein ones of said plurality of antenna elements (D) are arranged in a plurality of groups, such as panels, being predisposed in a certain direction in relation to one another.

7. The active antenna system according to claim 6, wherein each of said plurality of calibration nets (C) serves a specific one of said plurality of groups.

8. The active antenna system according to claim 6, wherein each of said plurality of calibration nets (C) serves a plurality of antenna elements (D) from different ones of said plurality of groups.

9. The active antenna system according to claim 6, wherein each of said plurality of calibration nets (C) serves a plurality of antenna elements (D) from different ones of said plurality of groups, but no calibration net serves adjacent antenna elements within the same group.

10. The active antenna system according to claim 1, wherein each of said plurality of calibration nets is separate, or at least may be disconnected, from one another.

11. A method of operating an active antenna system having a plurality of antenna elements (D); an exciter/receiver unit (ERU); a plurality of transmit/receive (T/R) modules (TRM1–TRMk); a feed and receive transmission network (R) connecting said ERU and said plurality of T/R modules; a plurality of antenna feeds (AF) connecting said T/R modules and said plurality of antenna elements; a beamforming unit (BFU), wherein said beamforming unit (BFU) controls the phase and amplitude of signals transmitted through each T/R module to produce a desired beamform from said plurality of antenna elements; a calibration unit (CU); and a calibration network coupling said calibration unit (CU) and points on said antenna feeds (AF), wherein said calibration network comprises a plurality of alternative calibration nets (C1, C2 ... Cj), and wherein each T/R module comprises a switch (SM) for switching between alternative antenna feeds (A/F) and thereby between alternative calibration nets, said method comprising the steps of:

coupling a first calibration signal from a first of said plurality of calibration nets to a first subset of said plurality of antenna elements, said first calibration signal being transferred through a first antenna feed (AF) by operating a switch in one of said plurality of T/R modules (TRM1) such that the signal is passed through a first branch in said transmit and receive network (R) to a port (XR) of said exciter/receiver unit (ERU), all other switches in other ones of said plurality of T/R modules being operated such that no other signal is transferred through the transmit and receive network to said port (XR);

measuring the attenuation and/or phase delay (CS111R) of the first calibration signal and storing as a first result ($\Delta 111$);

coupling a second calibration signal from a second of said plurality of calibration nets to a second subset of said plurality of antenna elements, said second calibration signal being transferred through a second antenna feed (AF) by operating a switch (SM) in the same T/R module (TRM1) such that the second calibration signal is passed through the same first branch in said transmit and receive network (R) to said port (XR), all other switches in other ones of said plurality of T/R modules being operated such that no other signal is transferred through the transmit and receive network to said port (XR);

measuring the attenuation and/or phase delay (CS211R) of the second calibration signal and storing as a second result ($\Delta 211$); and if the two results ($\Delta 111$ and $\Delta 211$) are different, establishing that a drift in at least one of said first and second calibration nets (C) has occurred.

12. The method of operating an active antenna system according to claim 11, further comprising the steps of:

coupling a third calibration signal from a third of said plurality of calibration nets to a third subset of said plurality of antenna elements, said third calibration signal being transferred through a third antenna feed (AF) by operating a switch (SM) in the same T/R module (TRM1) such that the third calibration signal is passed through the same first branch in said transmit and receive network (R) to said port (XR), all other switches in other ones of said plurality of T/R modules being operated such that no other signal is transferred through the transmit and receive network to said port (XR);

measuring the attenuation and/or phase delay (CS311R) of the third calibration signal and storing as a third result ($\Delta 311$); and if two results through the same T/R module correspond to one another while a third result through the same T/R module differs from the others, establishing that a drift in the latter calibration net has occurred.

13. The method of operating an active antenna system according to claim 12, wherein at least the first, second or third result ($\Delta 111$, $\Delta 211$, $\Delta 311$) are stored for compensating the amplitude and/or, phase of signals from or to the exciter/receiver unit (ERU) for accomplishing the desired directional steering capabilities of said active antenna system.

14. The method of operating an active antenna system according to claim 12, further comprising the step of calibrating a drifting calibration net according to the calibration nets that yield corresponding results.

15. The method of operating an active antenna system according to claim 11, further comprising the step of repeating the method for all antenna elements and all calibration nets.

* * * * *

UNITED STATES PATENT AND TRADEMARK OFFICE
CERTIFICATE OF CORRECTION

PATENT NO.        : 7,038,633 B2
APPLICATION NO.   : 10/488666
DATED             : May 2, 2006
INVENTOR(S)       : Eriksson It is certified that error appears in the above-identified patent and that said Letters Patent is hereby corrected as shown below:

In Column 4, Line 19, delete "D11-Dnhv." and insert -- D111-Dnhv. --, therefor.

In Column 7, Line 61, delete "Δhv," and insert -- Δ2hv, --, therefor.

In Column 8, Line 5, delete "K" and insert -- it --, therefor.

In Column 8, Line 11, delete "TIM" and insert -- T/M --, therefor.

Signed and Sealed this

Eleventh Day of December, 2007

JON W. DUDAS
*Director of the United States Patent and Trademark Office*